United States Patent [19]
Hozumi et al.

[11] Patent Number: 5,689,741
[45] Date of Patent: Nov. 18, 1997

[54] AUTOMATIC FOCUS CAMERA HAVING AN AUDIO DEVICE TO INDICATE AN IN-FOCUS STATE OF A LENS AND A METHOD THEREOF

[75] Inventors: Toshiaki Hozumi; Shozo Yamano, both of Tokyo, Japan

[73] Assignee: Nikon Corporation, Tokyo, Japan

[21] Appl. No.: 497,156

[22] Filed: Jun. 30, 1995

[30] Foreign Application Priority Data

Sep. 6, 1994 [JP] Japan ................ 6-212443

[51] Int. Cl.⁶ .......................................... G03B 13/36
[52] U.S. Cl. .................................... 396/130; 396/147
[58] Field of Search ........................... 354/409; 396/130, 396/147

[56] References Cited

U.S. PATENT DOCUMENTS

| | | | |
|---|---|---|---|
| 4,341,953 | 7/1982 | Sakai et al. | 250/204 |
| 4,466,726 | 8/1984 | Nakajima | 354/409 |
| 4,491,403 | 1/1985 | Sakai et al. | 396/147 |
| 4,597,659 | 7/1986 | Suda et al. | 354/409 |
| 5,528,332 | 6/1996 | Furutsu | 396/147 |

FOREIGN PATENT DOCUMENTS

| | | |
|---|---|---|
| 57-190936 | 11/1982 | Japan . |
| 59-135448 | 3/1984 | Japan . |

Primary Examiner—W. B. Perkey

[57] ABSTRACT

An automatic focus camera having a focal point detection unit to detect a focal point status of a photographic lens in relation to the subject, a focal point adjustment unit which drives the photographic lens to an in-focus position based on the detection results of the focal point detection unit, an audio device which generates an audio sound when the photographic lens is in-focus, a primary control unit which repeatedly executes the focal point adjustment operation of focal point adjustment unit until release is executed, and a prohibition unit which, during control by the primary control unit, drives the audio device only when photographic lens is in-focus the first time, and prohibits drive of the audio device when in-focus the second and subsequent times.

12 Claims, 4 Drawing Sheets

AUTOMATIC FOCUS CAMERA HAVING AN AUDIO DEVICE TO INDICATE AN IN-FOCUS STATE OF A LENS AND A METHOD THEREOF

BACKGROUND OF THE INVENTION

1. Field of the Invention

The present invention relates to a camera having an automatic focus function and, more particularly, to a camera having an automatic focus function which automatically executes focus operation and provides notification of in-focus detection with a sound, and a method thereof.

2. Description of the Related Art

An automatic focus (AF) camera is well known which can switch between two modes i.e., a one shot AF mode and a continuous AF mode. The one shot AF mode prohibits subsequent focal point adjustment operations once the focal point adjustment operation has been conducted and in-focus is acknowledged, and the continuous AF mode repeats the focal point detection operation and executes the automatic focus operation when the defocus state is acknowledged even if focal adjustment has already been executed. Such a conventional automatic focus camera is disclosed in Japanese Laid Open Patent Publication No. SHO 50-99729.

Meanwhile, there have been cameras which give notification of the in-focus status by generating a sound when a focal point detection state is recognized. These types of well known cameras have the sound generating function only when they are in the one shot AF mode, and they do not have the sound generating function when they are in the continuous AF mode.

The reason for this is that because the focal point adjustment operation is executed repeatedly when in the continuous mode, and if photographing a moving subject, etc., the camera frequently and repeatedly switches between the in-focus state and the defocus state. If an in-focus sound is issued corresponding to this situation, the sound will generate frequently and become extremely annoying to the ears of the photographer.

Nonetheless, even when in the continuous mode, if the user cannot confirm the in-focus state using a display unit which, for example, displays the focal point adjustment status, in-focus notification by generating a sound is an extremely effective way for confirming the in-focus state.

SUMMARY OF THE INVENTION

Accordingly, it is a primary object of the invention to overcome the above-noted problems. The inventors of the present invention have realized the above-noted problems and have developed solutions for these problems.

It is a further object of the present invention to provide an automatic focus camera having a sound device that generates an in-focus sound when a lens of the camera is in-focus even if the camera is in a continuous AF mode.

It is another object of the present invention to provide an automatic focus camera in which, even if the camera is in a continuous AF mode, in-focus notification through sound generation is executed in response to the lens being in-focus while the frequent generation of the in-focus sound is eliminated. As a result, the photographer can have in-focus notification with the same perception as in the one shot AF mode.

Additional objects and advantages of the invention will be set forth in part in the description which follows and, in part, will be obvious from the description, or may be learned by practice of the invention.

Objects of the invention are achieved by providing an automatic focus camera which includes an audio device, a focal point detection unit to detect the in-focus state of a photographic lens in relation to a subject, and a focal point adjustment unit to drive the photographic lens to the in-focus position based on the detection results of the focal point detection unit. The camera further includes a primary control unit which repeatedly executes the focal point adjustment operation of the focal point adjustment unit until release is executed, and a prohibition unit which, during control of the primary control unit, drives the audio device only when the photographic lens comes in-focus for the first time, and prohibits drive of the audio device the second and subsequent times of the in-focus state.

The automatic focus camera with the audio device according to a first aspect of the present invention further includes a secondary control unit which prohibits the focal point adjustment operation of the focal point adjustment unit if the photographic lens is in-focus one time, a selection unit to select either the primary control unit or the secondary control unit, and a modification unit to modify the audio pattern of the audio device corresponding to the selection results of the selection unit.

The automatic focus camera with the audio device according to a second aspect of the present invention further includes a secondary control unit which prohibits the focal point adjustment operation of the focal point adjustment unit if the photographic lens is in-focus one time, a selection unit to select either the primary control unit or the secondary control unit, and a modification unit to modify the audio frequency of the audio device corresponding to the selection results of the selection unit.

Because the automatic focus camera drives the audio device only the first time that the photographic lens is in-focus during control by the primary control unit, the audio device does not annoy the ears by frequently generating an audio sound.

The automatic focus camera according to the first aspect of the present invention modifies the audio pattern of the audio device by using the primary control unit and the secondary control unit. For this reason, the photographer can take photographs while confirming which one of the control units is being used.

The automatic focus camera according to the second aspect of the present invention modifies the frequency of the audio sound of the audio device using the primary control unit and the secondary control unit. For this reason, the photographer can take photographs while confirming which one of the primary and second control units is being used.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
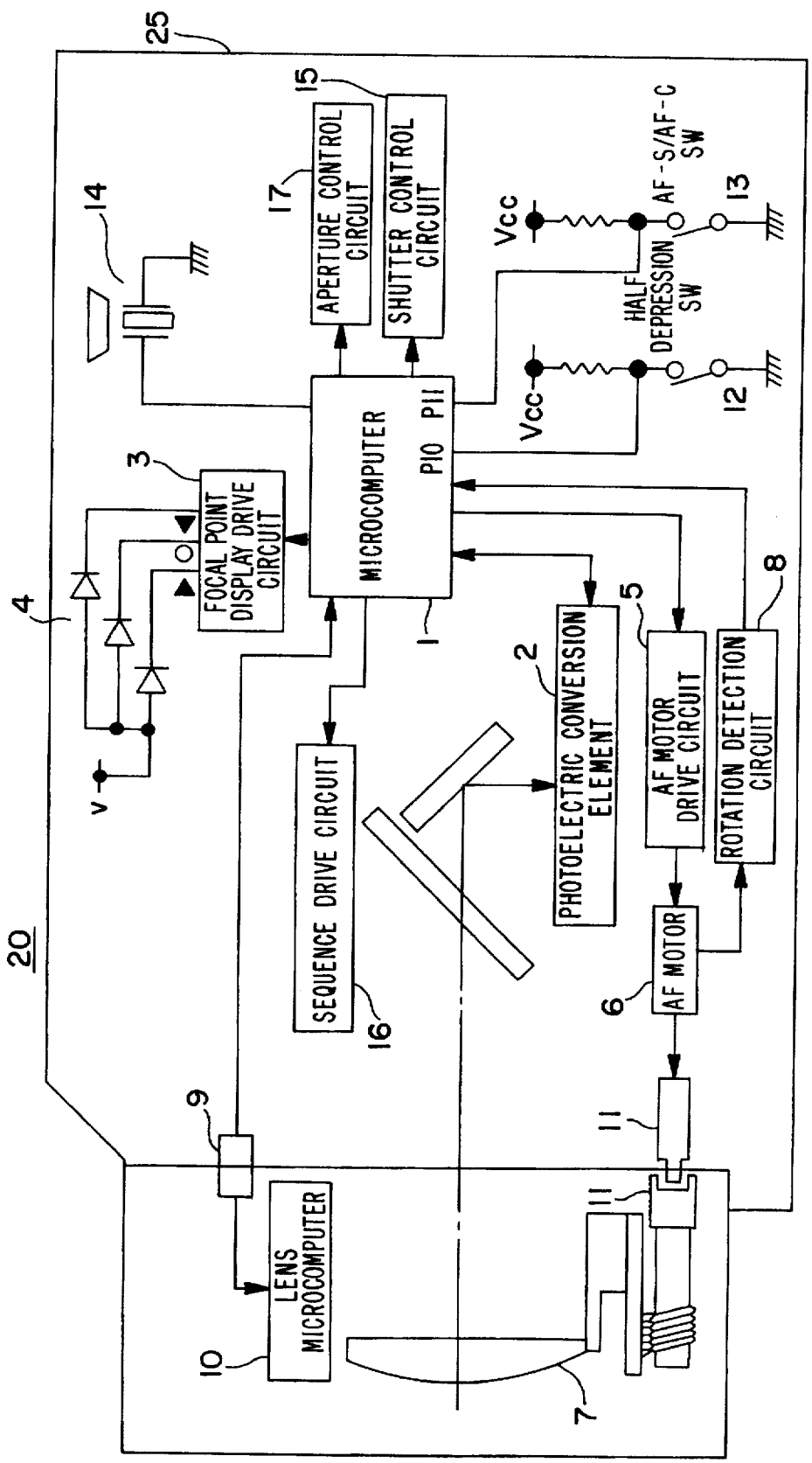
FIG. 1 is a block diagram of an automatic focus camera according to a first embodiment of the present invention.

These and other objects and advantages of the invention will become apparent and more readily appreciated from the following description of the preferred embodiments, taken in conjunction with the accompanying drawings of which:

FIG. 1 is a block diagram of an automatic focus camera according to a first embodiment of the present invention. A camera 20 includes a microcomputer 1 having overall control of the camera 20 and arranged in a camera body 25. The microcomputer 1 is a single chip microcomputer which has a serial communications function, a timer function, an A/D converter, an external interrupt function, a piezo-electric buzzer drive function, ROM and RAM, etc.

A photoelectric conversion element 2, which is represented by a charge-coupled device (CCD), for example, is connected to the microcomputer 1 for use in focal point detection, and the output thereof is received on the A/D conversion terminal of the microcomputer 1. One portion of the subject light fluxes passing through a photographic lens 7 is introduced onto the element surface of the photoelectric conversion element 2. A focal point display drive circuit 3 is connected to the microcomputer 1, and is driven by the microcomputer 1 in order for the results of focal point detection by the microcomputer 1 to be displayed on light-emitting diodes (LEDs) 4 in a specified display form.

A piezo-electric buzzer 14, which generates the in-focus sound corresponding to the focal point detection results notifying a photographer of the in-focus state, is also connected to the microcomputer 1, and can be directly driven by the microcomputer 1.

Further, the microcomputer 1 moves the photographic lens 7 to a desired focal point position corresponding to the detected focal point detection results by driving autofocus (AF) motor 6, through AF motor drive circuit 5, to rotate mechanical coupling spindle 11.

A rotation detection circuit 8, for example, a photointerrupter which generates pulses by the rotation of the AF motor 6, is connected to AF motor 6, and transmits the output to the microcomputer 1 which determines the amount of rotation of the AF motor 6.

Then, the microcomputer 1 obtains lens information necessary for automatic exposure (AE) and for automatic focal point adjustment (AF), and has serial communications with lens microcomputer 10 incorporated within a lens barrel.

One terminal of switch 12, which is connected to the half depression operation of an externally manipulated release button not shown in the drawing, is connected to port P10 of the microcomputer 1 such that the half depression operation is monitored. In the same way, one terminal of AF mode switch 13, for the purpose of switching between AF-S and AF-C AF modes based on the ON and OFF status of the AF mode switch 13 is connected to port P11. The AF-S mode is a single AF mode in which the AF operation is not executed after the in-focus state is recognized one time, and the AF-C mode is continuous AF which repeats the AF operation when the in-focus state is detected and afterwards a defocus state is detected.

Additionally, a sequence drive circuit 16 is connected to the microcomputer 1. The sequence drive circuit 16 moves a mirror, for light exposure and viewfinder operations, up and down, respectively, and charges the shutter by driving a sequence motor not shown in the drawing. Also connected to the microcomputer 1 are aperture control circuit 17, which controls the photographic lens 7 to a desired aperture value, and a shutter control circuit 15 for controlling a desired shutter exposure time.

Figure 2:
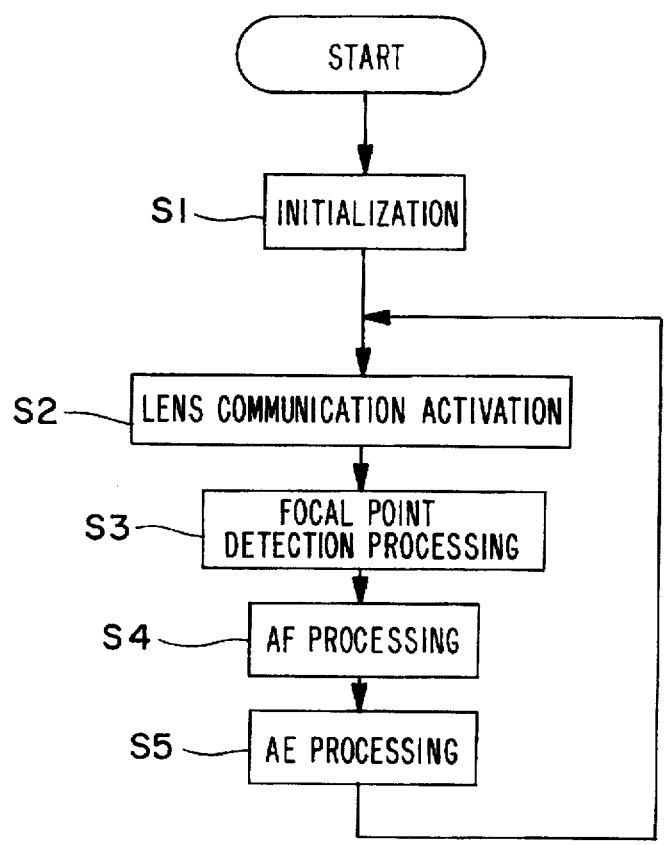
FIG. 2 is a flow chart of an operation of a microcomputer of the camera shown in FIG. 1.

The operation of the camera shown in FIG. 1 is explained using FIGS. 2 through 6(B). FIG. 2 is a flow chart of the microcomputer 1 of the camera 20 shown in FIG. 1. After initializing such features as the serial communications function, timer function, A/D converter, external interrupt function, piezo-electric buzzer drive function, and port function, and after clearing the built-in RAM at step S1 upon turning on a power source, the microcomputer 1 activates serial communications with the lens 7 for the purpose of obtaining the lens information necessary for AE and AF operations at step S2. Afterwards, focal point detection processing is executed at step S3, AF processing is executed at step S4, and AE processing at step S5. After jumping back to step S2, these operations are repeated in the same way from step S2.

Figure 3:
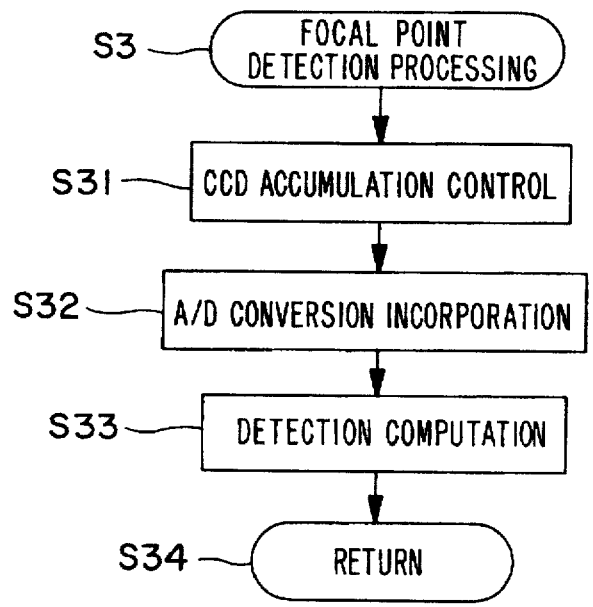
FIG. 3 is a flow chart of one of the steps shown in FIG. 2, performed by the microcomputer of the camera shown in FIG. 1.

FIG. 3 is a flow chart indicating the specific operations of focal point detection processing indicated at step S3 in FIG. 2. CCD accumulation control is executed at step S31, the CCD image data is received and converted by the A/D converter, which is a part of the microcomputer 1, at step S32, the well known focal point detection computations are executed at step S33, and the flow returns at step S34. For the focal point detection computations, many conventional cameras are known to use the CCD image data to execute correlation computations. As a result of this, the amount of subject defocus at the time of CCD accumulation can be obtained. Moreover, if the specified threshold value of correlative detection, etc., cannot be satisfied, a determination is made that the camera is in a low contrast state.

Figure 4:
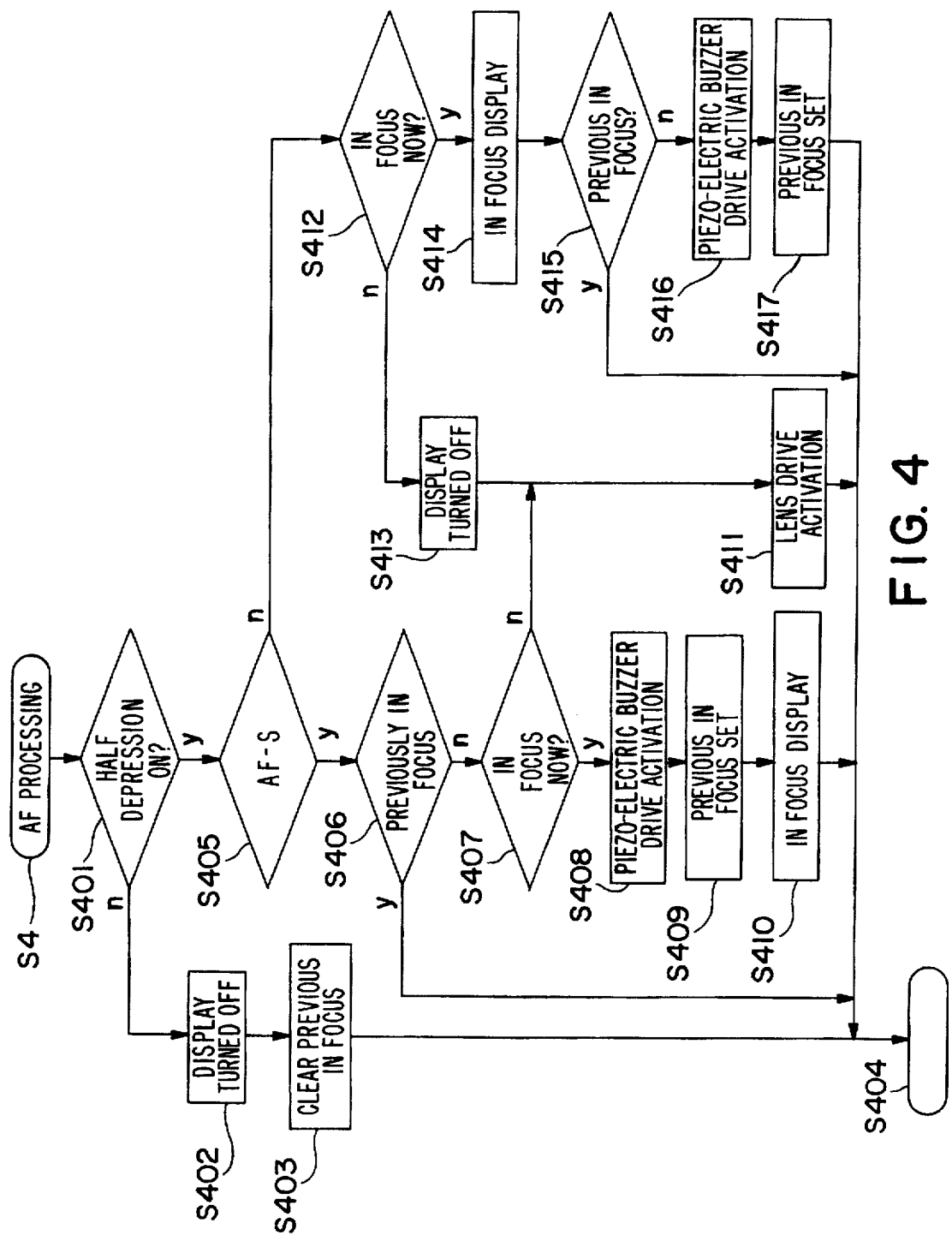
FIG. 4 is a flow chart of another one of the steps, shown in FIG. 2, performed by the microcomputer of the camera shown in FIG. 1.

FIG. 4 is a flow chart indicating a description of the AF processing shown in step S4 of FIG. 2. First, it is discerned whether the release button has been pressed half way down by determining the input level of port P10 at step S401. If it not pressed half way down, the display on LEDs 4 is extinguished at step S402. At step S403, what was in-focus in the past is not held, "previous in-focus" status is cleared, it is assumed that the lens 7 was not in-focus in the past, and the lens drive is not activated. The flow then returns at step S404. Consequently, with the half depression status OFF (switch 12 OFF), the focus point detection display is extinguished, and the lens 7 is not driven.

If the half depression 12 switch is ON at step S401, it is determined whether the AF-S or AF-C mode has been set by detecting the level of port P11 at step S405. If the AF-S mode has been set, a determination is made at step S406 whether there was a previous in-focus state, and if there was a previous in-focus state, the flow jumps to return at step S404. If there was not an in-focus state in the past at step S406, at step S407 a determination is made whether the lens 7 is in-focus based on the focal point detection results at this time. If the lens 7 is in-focus at this time, the flow advances to step S408, the piezo-electric buzzer 14 is driven and the reporting sound is executed in a stipulated pattern. Additionally, at step S409 it is memorized that in-focus was authorized in the past by setting camera to a "previous in-focus" status. Then, at step S410, the in-focus display is given to focal point display drive circuit 3, and the flow returns at step S404. If the lens 7 is not in-focus at the time of step S407, at step S411, the amount to drive AF motor 6 is derived from the data on the amount of image plane movement per mechanical coupling spindle 11 rotation by which the amount of defocus that has already been obtained by communication with the lens 7 based on the focal point detection results. The process then returns at step S404.

Meanwhile, if the AF-C mode is set, the in-focus state at this time is first determined at step S412. If the lens 7 is not in-focus this time, the display is extinguished at step S413, and the lens is activated at step S411. If it is in-focus this time, the in-focus display is executed at step S414, and a determination is made whether the lens 7 was previously in-focus at step S415. If it was in-focus in the past, the flow returns at step S404 with the status remaining the same. If it was not in-focus in the past, the piezo-electric buzzer 14 is driven at step S416, the "previous in-focus" status is set at step S417, and flow returns at step S404.

Figure 5A:
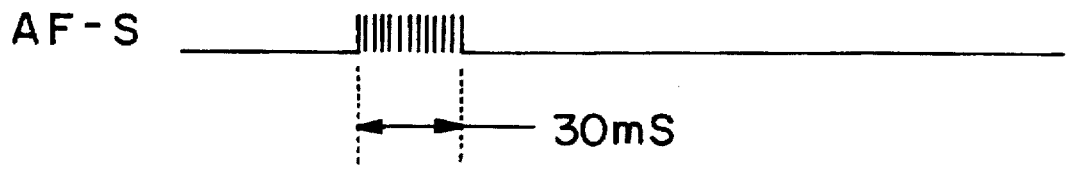
FIGS. 5(A) and 5(B) are wave form diagrams representative of the audio sound drive with AF-S and AF-C, respectively.
Figure 5B:
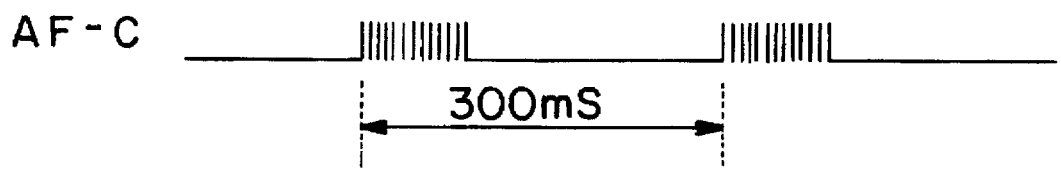
Figure 6A:
FIGS. 6(A) and 6(B) are wave form diagrams representative of the audio sound with autofocus-single (AF-S) and autofocus-continuous (AF-C) modes, respectively.
Figure 6B:
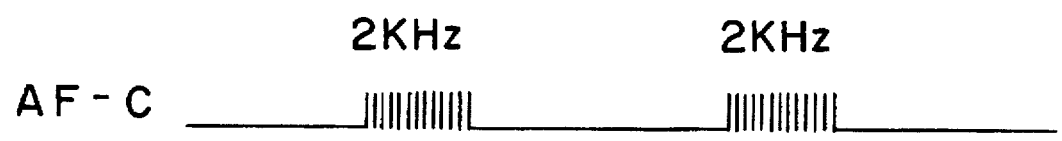

FIGS. 5(A) and 5(B), and 6(A) and 6(B) are wave form diagrams when changing between AF-C and AF-S modes during driving of the piezo-electric buzzer 14. In FIGS. 5(A) and 5(B), the drive pattern is changed, and in FIGS. 6(A) and 6(B), the drive frequency is changed.

As explained above, because the automatic focus camera audio device drives an audio device only when there is an initial in-focus state of the photographic lens during control by the primary control unit, the photographic lens can be recognized to be in-focus without the audio device annoying the ears of a photographer by frequently generating an audio sound.

The automatic focus camera according to one aspect of the present invention modifies the audio pattern of the audio device by using the primary control unit (a portion of the microcomputer 1) and the secondary control unit (another portion of the microcomputer 1). For these reasons, a photographer can take photographs while recognizing which control mode is being used.

The automatic focus camera according to a second aspect of the present invention modifies the audio frequency of the audio device by using the primary control unit and the secondary control unit. For this reason, the photographer can take photographs while recognizing which control mode is being used.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An automatic focus camera having a lens, comprising:
   a focal point apparatus to detect a focal point status of the lens and, in response, driving the lens to an in-focus position;
   a start focus detection device to start the operation of said focal point apparatus;
   an audio device to generate a sound in response to the lens being in-focus; and
   a control device to repeatedly control said focal point apparatus, in a continuous mode, to drive the lens to the in-focus position even after said focal point apparatus has detected an in-focus state and a subsequent defocus state of the lens, said control device causing said audio device to generate the sound in the continuous mode only an initial time the lens is in the in-focus state during the period between the start and end of the focal point detection by said focal point apparatus.

2. The automatic focus camera as claimed in claim 1, wherein said control device comprises:
   a primary control unit to cause said focal point apparatus to drive the lens during the continuous mode; and
   a secondary control unit to cause said focal point apparatus to drive the lens during a single mode wherein the lens is driven to the in-focus state only once;
   wherein said control device alters the sound based upon which one of said primary and secondary control units is operating.

3. The automatic focus camera as claimed in claim 2, wherein said control device alters the sound by adjusting a frequency of the sound.

4. The automatic focus camera as claimed in claim 2, wherein said control device alters the sound by adjusting an audio pattern of the sound.

5. An automatic focus camera having a lens, comprising:
   a focal point detection unit to detect a focal point status of the lens in relation to a subject;
   a start focus detection device to start the operation of said focal point detection apparatus;
   a focal point adjustment unit to perform a focal point adjustment operation by driving the lens to an in-focus position based upon the detection results of said focal point detection unit;
   an audio device to generate a sound in response to the lens being in-focus;
   a primary control unit to repeatedly control said focal point adjustment unit to perform the focal point adjustment operation during a continuous mode until a shutter release of the camera is executed; and
   a prohibition unit to drive said audio device to generate the sound during the continuous mode of said primary control unit only when the lens is in the in-focus state an initial time, said prohibition unit prohibiting drive of said audio device during the continuous mode when the lens is in the in-focus state a second and subsequent times, in the period between the start and end of the focal point detection by said focal point detection apparatus.

6. The automatic focus camera as claimed in claim 5, further comprising:
   a secondary control unit to prohibit the focal point adjustment operation after the lens is in-focus the first time;
   a selection unit to alternately select said primary and secondary control units; and
   a modification unit to modify an audio pattern of the sound based upon the selection of said selection unit.

7. The automatic focus camera as claimed in claim 5, further comprising:
   a secondary control unit to prohibit the focal point adjustment operation after the lens is in-focus the first time;
   a selection unit to alternately select said primary and secondary control units; and
   a modification unit to modify an audio frequency of the sound based upon the selection of said selection unit.

8. A method of generating sounds to indicate an in-focus state of a lens of an automatic focus camera, said method comprising the steps of:
   starting detection of the focal point status of the lens;
   determining whether the lens is in an in-focus state during a continuous mode wherein the lens is repeatedly driven to an in-focus position even after the lens has reached the in-focus position and a subsequent defocus position;

determining whether the lens has previously reached the in-focus position if said lens has been determined to be in the in-focus position during the continuous mode; and generating a first one of the sounds only if the lens has not previously reached the in-focus position during the continuous mode, in the period between the start and end of the focal point detection.

9. The method as claimed in claim 8, further comprising the steps of:

determining, prior to said step of determining whether the lens is in the in-focus position during the continuous mode, which one of the continuous mode and a single mode the camera is in, the single mode being a mode in which the lens is driven to the in-focus position only once; and generating a second one of the sounds if the lens is in the in-focus position and the camera is in the single mode.

10. The method as claimed in claim 9, further comprising the step of setting the camera to a previously in-focus state indicating the lens has reached the in-focus position subsequent to the steps of generating the first and second sounds.

11. The method as claimed in claim 9, wherein the second one of the sounds differs in frequency from the first one of the sounds.

12. The method as claimed in claim 9, wherein the second one of the sounds differs in pattern from the first one of the sounds.

* * * * *